Sept. 14, 1954  T. W. WHITWORTH ET AL  2,688,888
LAWN MOWER SHARPENER
Filed June 2, 1951
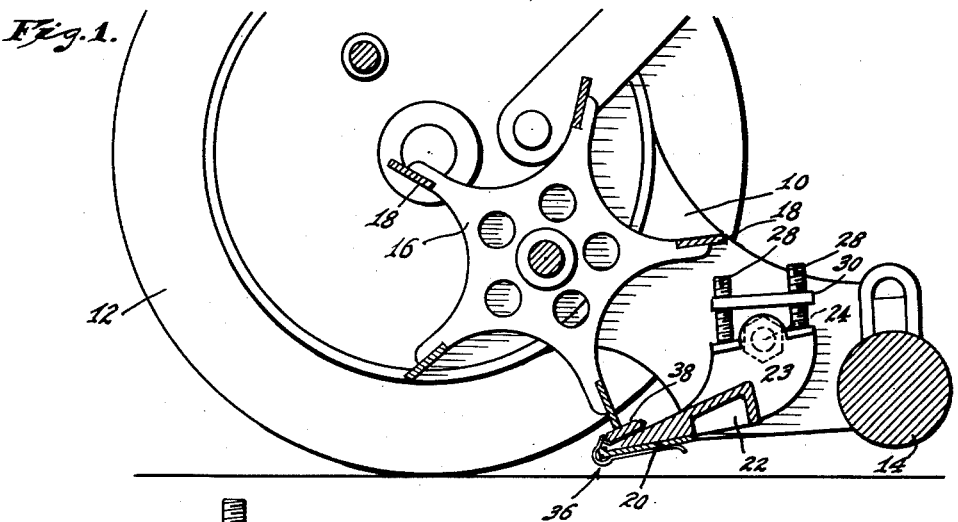
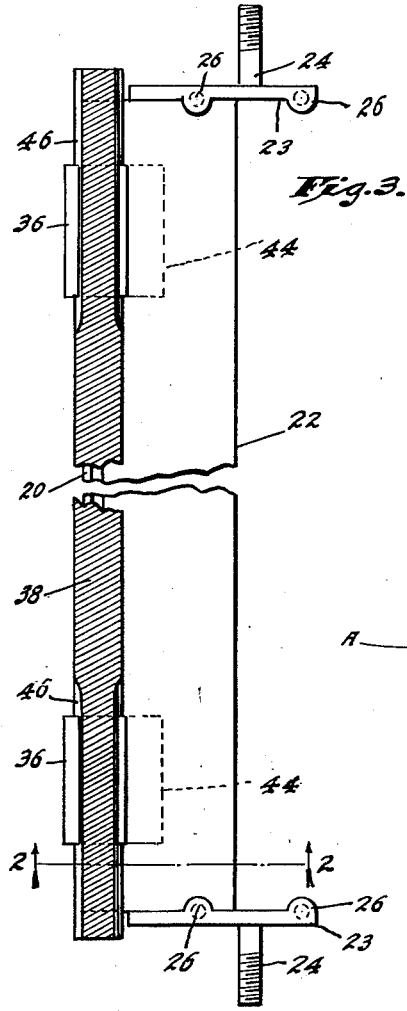
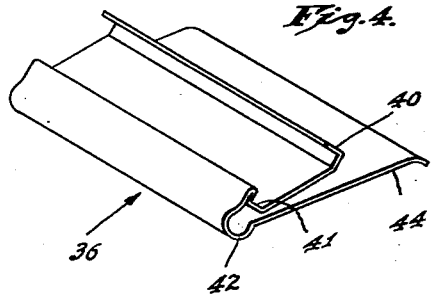
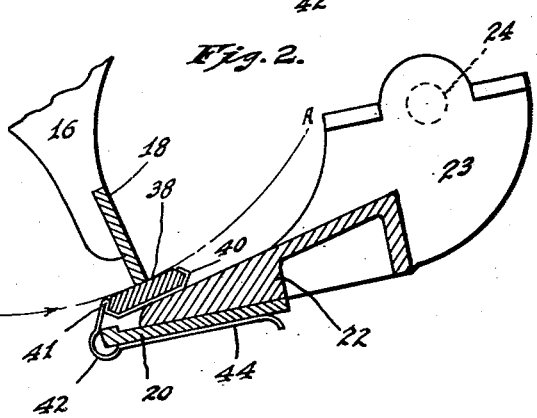
INVENTORS.
Thomas W. Whitworth and
BY Carl S. Reiber,
ATTORNEYS.

Patented Sept. 14, 1954

2,688,888

UNITED STATES PATENT OFFICE 2,688,888

LAWN-MOWER SHARPENER

Thomas W. Whitworth and Carl S. Reiber,
Indianapolis, Ind.

Application June 2, 1951, Serial No. 229,614

8 Claims. (Cl. 76—82.1)

This invention relates to a device for sharpening and dressing the cutting blades of a lawn-mower of the type having a cutter bar and a cutting reel mounted on a horizontal axis. Grass-cutting is obtained in mowers of this type by means of the action of revolving cutting blades scraping across a stationary cutter bar.

It is an object of our invention to produce a simple, inexpensive sharpening device which may be readily attached, operated, and removed by the lawn-mower operator, thus permitting sharpening to be done on-the-job and avoiding the expense and delay incurred in sending the mower to a specially skilled workman for the repairs.

It is another object to produce an attachment which presents the sharpening tool in parallel relationship to the cutter bar throughout the whole extent of the cutter bar, thus permitting a rapid and true sharpening of each and all the cutter blades throughout their entire operating extent.

It is a further object to produce a device which sharpens the cutting blades with no dis-assembly of the mower parts, and operative with the cutter reel turning in its normal direction of rotation.

It is a further object to produce a sharpening attachment operable on both manually-operated and power-operated mowers, and adaptable to fit many different widths of lawn-mowers.

It is another object to produce a sharpening attachment of simple and economical construction, the operation of which is not dependent on a reel-driving source nor a reel-mounting device other than the conventional lawn-mower elements.

These and further objects of our invention will become apparent as the description is understood.

In carrying out the invention we form two or more clips or file-holders, each from a continuous length of sheet metal. Each of these clips is formed with a locating portion of U-shape for mounting on the knife of a lawn-mower, and with a file-holding portion of shallow U-shape for carrying a flat sharpening file. The clips support the file in a manner such that a flat side is presented towards the lawn-mower cutting blades so that rotation of the blades in a normal lawn-mowing manner will cause the blades to become sharpened thereby. The clip-engaging portions of the file are beveled at the edges so that the file-holding clip-portions may grip those edges without projecting above the upper face of the file where they would interfere with rotation of the reel.

The accompanying drawing illustrates our invention: Fig. 1 is a vertical cross-section transverse to the axis of the reel of a common type of lawn-mower showing our device mounted in place; Fig. 2 is a fragmental cross-section on an enlarged scale taken on the line 2—2 of Fig. 3; Fig. 3 is a plan view of the knife and knife-support with the sharpener in place thereon; and Fig. 4 is an isometric view of one of the file-holding clips.

The lawn-mower shown for the purposes of describing our invention is of well-known construction. It includes a frame 10, supported at the front by wheels 12 and at the rear by a roller 14. The wheels 12 drive a cutting reel 16 to move the cutting blades 18 thereof past and in shearing relation with a knife 20. As shown, the knife 20 is a replaceable element mounted on a knife-support 22; although this arrangement is not essential.

Near the ends thereof, the support 22 is provided with upwardly disposed ears 23, through which extend aligned trunnion bolts 24 which pivotally mount the support 22 on the frame 10. To provide for locating the knife 20 for the purpose of adjustment with respect to the cutting blades 18, the ears 23 of the support are provided with lugs 26, upon which bear the ends of adjustment screws 28. The adjustment screws 28 threadedly engage a fixed boss 30 of the frame 10, so that interrelated rotation of the adjustment screws 28 causes the knife 20 to be swung about the axis of the trunnion bolts 24 and thereby be positioned in the desired space-relation with respect to the arc "A" described by the cutting edges of the cutting blades 18 as the reel rotates.

The apparatus so far described is well-known, and forms no part of our invention.

Our invention lies in the attachable means we provide for sharpening the cutting blades 18, which means is adapted to be used in association with the above-described well-known elements without any dis-assembly thereof. This sharpening attachment comprises at least two spaced clips or file-holders 36 adapted to be mounted on the knife, or on the sub-assembly of knife 20 and support 22, and adapted to hold or carry a flat file 38 in a position such that as the cutting blades 18 are revolved in scraping engagement with a surface of the file the cutting blades will be sharpened. As shown, each clip comprises a resilient sheet-metal strip bent on spaced transverse lines to provide rear and front fingers 40 and 41 defining a file-seat and adapted resiliently to grip the file 38 between them. At the upper edge of the front finger 41, the strip is bent sharply back on itself for a distance, and is then bent downwardly and rearwardly on a substantial radius as shown at 42 and terminates in a straight portion 44 which, when the sharpener is in operative position, lies against the lower face of the knife 20. The bend 42 is formed so that it may seat against the front edge of the knife and limit rearward movement of the clip and so that the file seat and portion 44 will resiliently grip the knife and/or its support when the sharpener is in place.

To render the clips effective to prevent upward withdrawal of the file from its seats therein, we grind away or otherwise bevel the edges of the file surface presented toward the reel and shape the upper ends of the fingers 40 and 41 to fit against the downwardly divergent faces 46 thus formed. Desirably, all side edges of the file are similarly beveled, so that either flat face of the file may be selected to sharpen the blades. Such selectivity is desired when one face has been worn smooth, or when it is desired to use a certain one of two file faces having different filing characteristics.

If, as is desirable, the clips are so constructed as to support the file forwardly of the ears 23, the file may project outwardly past the ears, thus making it possible to use the same file on mowers of any width up to the length of the file. The beveled faces 46 desirably extend inwardly from the ends of the file, for a distance greater than the width of the clips, thus making it possible to position the clips along the file in the most advantageous position.

In using our device for sharpening the cutting blades of a lawn-mower, the support 22 is adjusted to a low position by rotation of the adjusting screws 28. The clips 36 are then pushed rearwardly onto the front of the knife until the bend 42 engages the front edge of the knife 20.

The support 22 is then adjusted upwardly until the file engages the "high spots" along the edges of the cutting blades 18. Moving the drive wheels in the normal manner of operation of the particular lawn-mower then causes successive cutting blades 18 of the reel 16 to pass across the file 38 and be sharpened thereby.

Successive adjustments then are made to increase the height of the file until the desired evenness of the cutting blade edges is obtained. Desirably, the upward adjustments of the blade-scraper are step-by-step and each step is of small magnitude. By the use of this device a rapid and true sharpening of all the cutting blades is obtained.

When the desired evenness is obtained, the attachment is easily removed by pulling the clips forwardly. Then the support 22 is brought upwardly, by adjusting screws 28, until the knife 20 is in proper cutting relation with the reel-blades 18. The lawn-mower is then ready for normal operating use.

We claim as our invention:

1. A sharpening attachment for a lawn-mower having a bladed reel and a knife adjustable toward and away from the reel, said attachment comprising a file and two file-supporting clips for supporting the file above and parallel to the knife, each of said clips being formed of a single strip of resilient sheet metal bent on transverse lines to provide a U-shaped knife-embracing portion and two spaced fingers defining opposite sides of a file-seat above said knife-embracing portion, said file being located in the file-seats of the two clips with a cutting face presented upwardly toward the reel and with its opposite side edges resiliently gripped by said fingers, the width of said U-shaped knife-embracing portion, when the metal thereof is unstressed, being less than the thickness of the knife whereby such portion will resiliently grip the knife when in place thereon.

2. A sharpening attachment as defined in claim 1 with the addition that the file is beveled at the side edges of its cutting face to provide downwardly divergent faces, the upper ends of said fingers being bent toward each other to engage said divergent faces.

3. A sharpening attachment as defined in claim 2 with the addition that said divergent faces have an extent longitudinally of the file greater than the clips.

4. A sharpening attachment as defined in claim 1 with the addition that said file has cutting faces on opposite sides, said fingers having upper ends bent toward each other, the longitudinal edges of the file being beveled to provide divergent surfaces engageable with the bent finger-ends irrespective of which cutting face of the file is presented toward the reel.

5. A sharpening attachment as described in claim 4 with the addition that the lower end of the rear finger is formed to follow the lower bevel surface of the file carried by the clip, said lower end of the rear finger thereby being positioned to provide with respect to said knife-embracing portion an outwardly opening angle to facilitate application of the clip onto the knife.

6. A sharpening attachment for a lawn-mower having a bladed reel and a knife adjustable toward and away from the reel, said attachment comprising a file and a plurality of file-supporting clips for supporting the file above and parallel to the knife, each of said clips being formed of a single strip of resilient sheet metal bent on transverse lines to provide, successively, a lower leg of a U-shaped knife-embracing clamp, an interconnecting flexing portion having an upward stretch terminating at a reverse fold, a downward stretch forming a front file-retaining finger, a rearward stretch beneath the file to form an upper leg of said knife-embracing clamp, and an upwardly and forwardly bent portion forming a rear file-retaining finger.

7. A file-supporting means for a sharpening attachment for a lawn-mower having a bladed reel and a knife adjustable toward and away from the reel, said means comprising a clip for supporting a file above and parallel to the knife, said clip being formed of a single strip of resilient sheet metal bent on transverse lines to provide a U-shaped knife-embracing portion and two spaced fingers defining opposite sides of a file-seat above said knife-embracing portion, the width of the file seat, when the metal thereof is unstressed, being less than the width of the file, whereby said file seat will resilently grip the file carried therein, and the width of said U-shaped knife-embracing portion, when the metal thereof is unstressed, being less than the thickness of the knife whereby such portion will resiliently grip the knife when in place thereon.

8. A file-supporting means for a sharpening attachment for a lawn-mower having a bladed reel and a knife adjustable toward and away from the reel, said means comprising a clip for supporting a file above and parallel to the knife, said clip being formed of a single strip of resilient sheet metal bent on transverse lines to provide, successively, a lower leg of a U-shaped knife-embracing clamp, an interconnecting flexing portion having an upward stretch terminating at a reverse fold, a downward stretch forming a front file-retaining finger, a rearward stretch positioned to support a file thereon and forming an upper leg of said knife-embracing clamp, and an upwardly and forwardly bent portion forming a rear file-retaining finger.

References Cited in the file of this patent

UNITED STATES PATENTS

| Number | Name | Date |
|---|---|---|
| 673,355 | Barton | Apr. 30, 1901 |
| 990,559 | Jayme | Apr. 25, 1911 |
| 1,507,248 | Nelson | Sept. 2, 1924 |
| 1,756,162 | Minami | Apr. 29, 1930 |
| 1,887,394 | Bailey | Nov. 8, 1932 |
| 1,929,326 | McIlyar | Oct. 3, 1933 |
| 2,498,938 | Bentley | Feb. 28, 1950 |